(12) United States Patent
Hermerding et al.

(10) Patent No.: US 7,596,464 B2
(45) Date of Patent: Sep. 29, 2009

(54) DETERMINING THE THERMAL INFLUENCE OF COMPONENTS WITHIN A SYSTEM AND USAGE OF A MATRIX FOR POWER AND THERMAL MANAGEMENT

(75) Inventors: Jim G. Hermerding, San Jose, CA (US); Barnes Cooper, Beaverton, OR (US); Steve P. Frayne, Jr., Mountain View, CA (US); Eric Distefano, Livermore, CA (US); Sridhar V. Machiroutu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 10/954,379

(22) Filed: Sep. 29, 2004

(65) Prior Publication Data

US 2006/0064999 A1 Mar. 30, 2006

(51) Int. Cl.
*G01K 19/00* (2006.01)
(52) U.S. Cl. .................. 702/99; 62/259.2; 374/100
(58) Field of Classification Search ............... 62/259.2; 341/119; 374/100; 702/99, 130
See application file for complete search history.

(56) References Cited

U.S. PATENT DOCUMENTS

| 5,424,767 | A | * | 6/1995 | Alavizadeh et al. ........... 347/17 |
| 5,675,297 | A | | 10/1997 | Gose et al. |
| 6,535,798 | B1 | | 3/2003 | Bhatia et al. |
| 6,702,457 | B1 | * | 3/2004 | Smith .......................... 374/141 |
| 6,908,227 | B2 | * | 6/2005 | Rusu et al. ................... 374/141 |
| 2003/0109967 | A1 | | 12/2003 | Cooper |

FOREIGN PATENT DOCUMENTS

WO WO01/03483 A1 1/2001

OTHER PUBLICATIONS

Theerien, G., et al., U.S. Appl. No. 10/879,922, filed Jun. 28, 2004, entitled, "Extended Thermal Management".
Stanley, R., et al., U.S. Appl. No. 09/752,575, filed Dec. 29, 2000, entitled, "Mechanism For Managing Power Generated In A Computer System".
Hermerding, J., U.S. Appl. No. 10/334,233, filed Dec. 30, 2002, entitled, "Automated Method And Apparatus For Processor Thermal Validation".
Cooper, B., U.S. Appl. No. 10/027,392, filed Dec. 21, 2001, entitled, "Power Management Using Processor Throttling Emulation".
Cooper, B., U.S. Appl. No. 10/020,848, filed Dec. 12, 2001, entitled, "Operating System Coordinated Thermal Managment".
Jalaleddin, A., et al., U.S. Appl. No. 09/751,759, filed Dec. 30, 2000, entitled, "Demand-Based Method and System Of CPU Power Management".
Intel Pentium 4 Processor on 90 nm Process Thermal and Mechanical Design Guidelines, Feb. 2004, pp. 1-80.

\* cited by examiner

*Primary Examiner*—William E Tapolcai
(74) *Attorney, Agent, or Firm*—Kacvinsky LLC

(57) ABSTRACT

A method of creating a thermal influence table to describe thermal relationships between components in a system and use of the thermal influence table in a system is described. The thermal influence matrix may be generated dynamically for a system. The matrix may be used by a thermal management policy to enable a hot device to be cooled by power management of another device in the system.

9 Claims, 7 Drawing Sheets

| Theta | CPU | MCH | ICH | MEM | LAN |
|---|---|---|---|---|---|
| CPU | Theta [CPU:CPU] | Theta [MCH:CPU] | Theta [ICH:CPU] | Theta [MEM:CPU] | Theta [LAN:CPU] |
| MCH | Theta [CPU:MCH] | Theta [MCH:MCH] | Theta [ICH:MCH] | Theta [ICH:MCH] | Theta [LAN:MCH] |
| ICH | Theta [CPU:ICH] | Theta [MCH:ICH] | Theta [ICH:ICH] | Theta [ICH:ICH] | Theta [LAN:ICH] |
| MEM | Theta [CPU:MEM] | Theta [MCH:MEM] | Theta [ICH:MEM] | Theta [ICH:MEM] | Theta [LAN:MEM] |
| LAN | Theta [CPU:LAN] | Theta [MCH:LAN] | Theta [ICH:LAN] | Theta [ICH:LAN] | Theta [LAN:LAN] |

*Fig. 1*

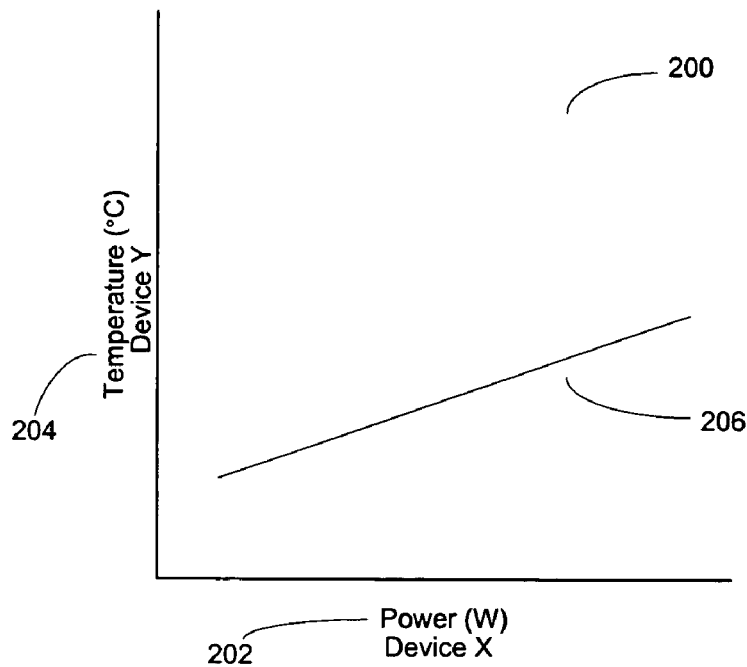

*Fig. 2*

```
Name (_TPT, Package ())                                    ╱─ 1002

{
        Package()  {CPU,       MCH,       ICH,       MEM}

Package()  {1000,      300,       800,       400}

Package()  { 700,      1000,      300,       300}

Package()  { 500,      400,       1000,      700}

Package()  { 600,      400,       500,       1000}

DETERMINING THE THERMAL INFLUENCE OF COMPONENTS WITHIN A SYSTEM AND USAGE OF A MATRIX FOR POWER AND THERMAL MANAGEMENT

BACKGROUND

The present invention relates to the field of computer systems, and more particularly to system thermal management and thermal throttling.

As microprocessors and other components within a computer system become faster and smaller, thermal management becomes more important to prevent device overheating or failure. Currently, if an overheated device, such as a processor, is detected, thermal throttling can be used to reduce the power to the device or to reduce the speed at which the device is running. However, this approach to thermal management considers only the temperature of the device itself, and does not take into consideration thermal coupling between devices in a system.

BRIEF DESCRIPTION OF THE DRAWINGS

A better understanding of the present invention can be obtained from the following detailed description in conjunction with the following drawings, in which:

FIG. 1 is an illustration of a thermal influence table according to one embodiment of the present invention.

FIG. 2 is a graph illustrating the thermal relationship between two components in a system according to one embodiment of the present invention.

FIG. 10 is an illustration of an example populated thermal influence table object according to one embodiment of the present invention.

DETAILED DESCRIPTION

Figure 3:
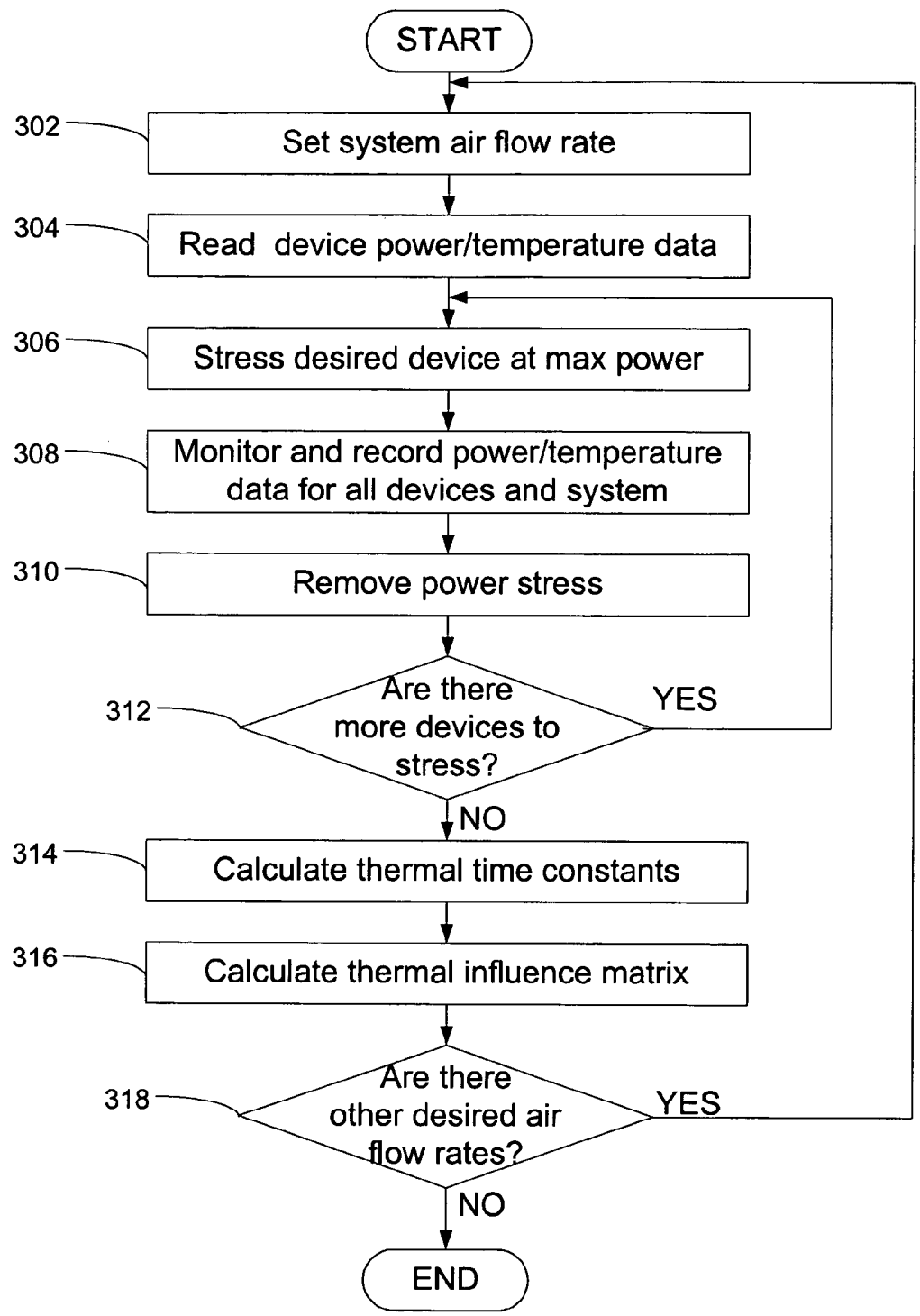
FIG. 3 is a flowchart illustrating one embodiment of the present invention.

Embodiments of a method, apparatus, and system to determine the thermal influence of components within a system and a method of using a model for a matrix for power and thermal management are disclosed.

In the following description, numerous specific details are set forth in order to provide a more thorough understanding of the present invention. It will be appreciated, however, that the invention may be practiced without such specific details. In other instances, control structures, gate level circuits and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Furthermore, the particular features, structures, or characteristics may be combined in any suitable manner in one or more embodiments.

In a computer system, device temperatures may be influenced by the amount of power and the influence or thermal coupling between two devices. As one device in a system heats up or cools down due to changes in power load and thermal coupling between devices, that device may influence the temperature of another device in the system. Thus, the temperature of a device may increase or decrease due to a change in power of another device. The thermal effect of one device upon another may be represented in a table or matrix format.

FIG. 1 illustrates a thermal influence matrix (100), or thermal influence table, according to one embodiment of the present invention. Each component in a system that participates in the system's thermal management policy may be represented by a row (102) and a column (104) in the matrix. The value of each cell (108, 110) of the matrix located at the intersection of each row and column represents the thermal relationship between the component represented by the row and the component represented by the column. Thus, the thermal relationships between components in the system are encoded in the matrix or table.

In one embodiment, each component in the thermal influence matrix is in thermal proximity to at least one other component in the matrix. Thermal proximity is met when a change in temperature or power of one component causes the temperature of a second component in a system either to increase or to decrease. In another embodiment, all components in the thermal influence matrix are in thermal proximity to one another.

The thermal relationship between two devices, Device X and Device Y is illustrated in the form Theta[Device X:Device Y] (° C./Watt). This value represents the indirect thermal effect of Device X's power on the temperature of Device Y. A higher Theta value indicates a stronger thermal relationship between devices. Referring again to FIG. 1, the thermal relationship in position 108, Theta[CPU:MCH], represents the indirect thermal effect of the microprocessor (CPU) on the temperature of the memory controller hub (MCH).

The thermal influence matrix may also show the direct thermal effect of a device. The direct thermal effect is the impact of a device's power on its own temperature. The direct thermal effects are illustrated in the form Theta[Device X:Device X]. For example, the thermal relationship illustrated in cell position 110, Theta[CPU:CPU] illustrates the direct thermal path for junction to ambient of the microprocessor. The theta values for the direct thermal effects will typically be higher than the theta values for indirect thermal effects.

The thermal relationships within the thermal influence matrix are determined for a predetermined system air flow rate. Thus, a single system may require multiple thermal influence matrices to describe thermal relationships between all components for multiple air flow rates.

The actual values within a thermal influence matrix may be dependent upon the air flow within the system, the layout of components in the system, and the thermal solutions, such as heat sinks, used within the system.

The thermal influence matrix/matrices may be stored in a memory location including, but not limited to, random access memory (RAM), read only memory (ROM), flash memory, magnetic or optical storage media. In one embodiment, the data contained in the thermal influence matrix may be stored in a non-matrix or non-table format. For example, the thermal influence relationship values may be stored in consecutive locations in memory.

FIG. 2 illustrates a graph (200) of the indirect thermal relationship between two devices in a system according to one embodiment of the present invention. The numerical value indicating the thermal relationship between two devices in a system, or Theta[Device X:Device Y], may be determined by taking the derivative of the temperature increase of device Y with respect to the derivative of the power of device X. Temperature (204) represents the temperature of device Y, while Power (202) represents the power of device X. For devices in thermal proximity to one another, the temperature of device Y will increase as the power of device X increases. The slope of the line (206) is equal to the change of the temperature increase with respect to the change in power, or dT/dP. Thus, the numerical value of Theta[Device X:Device Y] is approximately equal to the slope of the line (206).

The theta calculation for a direct thermal relationship, or the effect of a device's own power on its temperature, may be calculated in a similar manner by taking the derivative of the change in temperature of a component with respect to the change in power of the same component.

In one embodiment, a thermal influence matrix (or matrices) for a system may be generated by software that determines the thermal relationships between components in a system. FIG. 3 is a flowchart that illustrates one possible software algorithm that may be used to generate a thermal influence matrix.

First, as shown in block 302, the system air flow rate or fan speed is set. In one embodiment, the fan speed is first set to a high flow rate of approximately 3-5 cubic feet per minute (CFM). In other embodiments, the fan may be set to a lower speed, or may be turned off. Next, as shown in block 304, device power and temperature data may be read. In one embodiment, reading device power and temperature data may include reading the power states of all system components as well as the utilization of each component. Power state and utilization data may be read from information stored in each individual component's software accessible registers, or may be accessed from a thermal management driver or from preloaded values at software runtime. Reading device power and temperature data may also include reading the maximum power, idle power, power per performance state, and temperature of each component. In addition, system data may be read. System data may include total system power, read from the system voltage regulator circuit, as well as the local ambient temperature outside of the system.

After all system components reach a steady state temperature, a first device may be stressed to the level of its maximum power, or to a level substantially approaching the device's maximum power (block 306). As the device power and temperature are ramping to maximum power, the temperature changes of all other components in the system may be monitored and recorded until the temperature of the first device reaches a steady state (block 308). Total system power may also be recorded. In another embodiment of the present invention, two or more devices in the system may be simultaneously stressed while reading temperature data from other components in the system.

The power stress may be removed from the first component after it has reached steady state (block 310).

If there are additional devices that participate in the power management policy, each of these devices may be independently stressed in the same manner as the first device (block 312). As each device is stressed to its maximum power, the temperature changes of all other components in the system are recorded until the device under stress reaches a steady state temperature. When all devices have been stressed and temperature and power data recorded, thermal time constants may be calculated for all components in the system using the power and temperature data that was collected as each device was stressed (block 314).

After each device has been stressed, and power/temperature data has been recorded for all system components that participate in the power management policy, the thermal influence matrix may be calculated (block 316). As described above, the values in the thermal influence matrix are calculated by taking the derivative of the change in power of a first device (the stressed device) with respect to the change in temperature of another device (the other devices in the system).

As illustrated by block 318, after a thermal influence matrix has been calculated for one air flow rate, another thermal influence matrix may be calculated for another desired air flow rate. After the air flow rate is set (block 302), power and temperature data is read (block 304), and the devices in the system are individually stressed (block 306) while measuring the power/temperature data for other devices in the system (block 308). In this manner, thermal influence matrices can be created for all desired system air flow rates. Each thermal influence matrix generated will correspond to one system airflow rate. In one embodiment, thermal influence matrices may be created for air flow rates ranging from zero CFM to five CFM or higher.

In one embodiment, the algorithm to calculate the system's thermal influence matrix (or matrices) may be run the first time a system is booted. In another embodiment, this algorithm may be run when the system detects a change to the system configuration that would affect the thermal properties of the system. Such changes may include the addition or removal of system components, such as memory or add-in cards, as well as upgrades of system components such as the microprocessor. Using an automated software approach allows for precise and repeatable collection of data and generation of the thermal matrix in both prototype and production environments.

Both the thermal influence matrices and the thermal time constants may be used as inputs to system thermal management mechanisms, such as a thermal management policy, that are software or hardware based.

The thermal influence matrix, or thermal influence table, allows one to evaluate the impact of a change in device power or temperature on the temperature of another device. Thus, by using the matrix and knowing the temperature and powers of other components in the system, one can determine the change in temperature of any component due to the change in power of another component. For example, the temperature of each component may be established by the following equation, where dev_N are individual components or heat sources, $P_{dev\_N}$ is the power of each device (W), $T_{ambient}$ is the local ambient temperature (° C.), and Theta is measured in ° C./W as described above:

$$T_{dev\_B} = T_{ambient} + Theta[dev\_A : dev\_B] * P_{dev\_A} +$$
$$Theta[dev\_B : dev\_B] * P_{dev\_B} + Theta[dev\_C : dev\_B] * P_{dev\_C} + \ldots +$$
$$Theta[dev\_N : dev\_B] * P_{dev\_N}$$

The ability to establish this thermal relationship between components is useful when many integrated circuit components or other heat generating devices exist within a single enclosure. Knowing the thermal relationships between components allows a system designer to focus on problem areas by quickly observing which devices can influence the temperature of others, and redesigning airflow, placement, or cooling solutions to solve thermal issues.

In embodiments of the present invention, the thermal influence matrix may be used for thermal management of a system by an operating system (OS), device driver, hardware, or other software or firmware mechanisms to evaluate which devices in a system may be contributing to the temperature of a "hot" device. A hot device may be defined as a device that is approaching or that exceeds a predetermined threshold temperature. Based upon this evaluation, algorithms may be enabled to determine which device(s) power or performance should be reduced in order to have the greatest influence on reducing the temperature of the hot device. Thus, if device A is getting too hot, use of the thermal influence matrix may allow a power management algorithm to determine what devices have the greatest influence on device A's temperature. The algorithm may then reduce the power of one or more of the influential device(s) in order to lower the temperature of device A.

Figure 4:
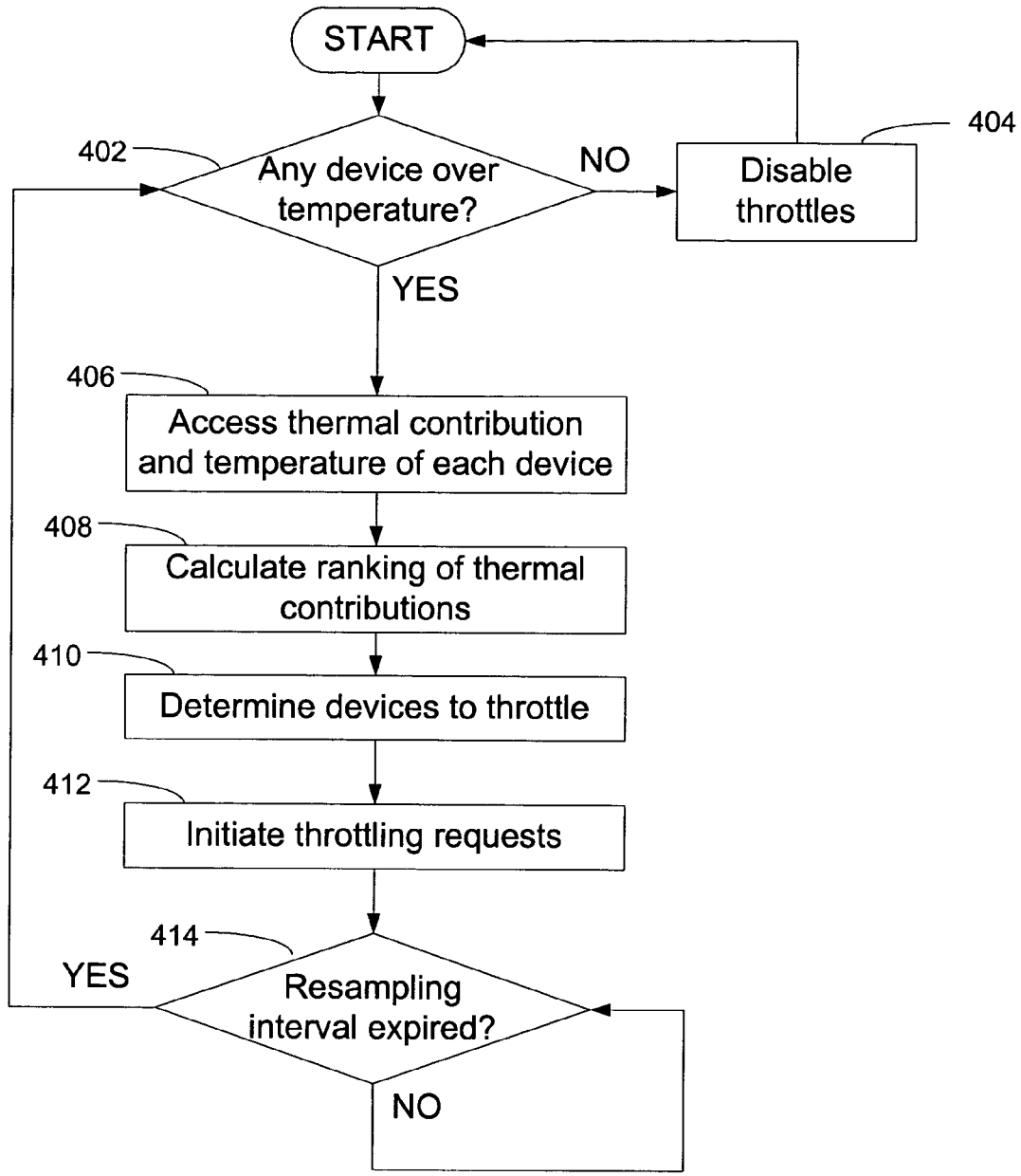
FIG. 4 is a flowchart illustrating one embodiment of the present invention.

FIG. 4 is a flowchart illustrating one embodiment of the present invention wherein the thermal influence matrix is used as part of a thermal management policy to thermally manage one or more devices in a system. The thermal management policy may be implemented by an operating system (O/S), device drivers, firmware, or other hardware or software. For example, a device driver may provide an interface to get or to set any of the values defined by the thermal management policy, including but not limited to temperature, power level, and performance/throttle states.

First, a determination is made whether any device in a system is over temperature (402). If no device is over temperature, then all throttles may be disabled (404). If any device is over its predetermined threshold temperature, the thermal contribution and temperature of each device is accessed (406). Using the thermal contribution and temperature of each device in conjunction with a thermal influence matrix, a ranking of thermal contributions may be calculated (408). Based upon the ranking of thermal contributions, the thermal management policy may determine which devices to throttle (410).

In one embodiment, the determination of which devices to throttle may be made based upon those devices that are in a top predetermined percentage of the thermal contribution ranking. For example, the devices that are in the top 25% of the ranking may be throttled. In another embodiment, the top N devices may be throttled, where N is a predetermined number between 1 and the number of devices participating in the thermal management policy.

Next, throttling requests are initiated to those devices that will be throttled (412). Throttling a component may include reducing power or reducing power dissipation by the component. Throttling may be done by reducing the operating frequency of a device, reducing power to the device, disabling functional blocks in the system, or in any other way which would reduce the power or power dissipation of the component.

After a predetermined resampling interval has expired (414), the thermal management policy, which may comprise the O/S or thermal management software, will repeat the algorithm at block 402 by determining if any device is over temperature.

FIGS. 5-8 illustrate one embodiment of an implementation for a software reporting structure that may be used by a thermal management policy to determine which devices to thermally manage in a system. The software reporting structure may include one or more device power tables, one or more device throttle state tables, a device throttle control object, and one or more thermal influence tables. Many other embodiments are possible as well, including the use of hardware registers, memory mapped I/O, or device driver native interfaces to determine which device(s) to thermally manage.

Figure 5:
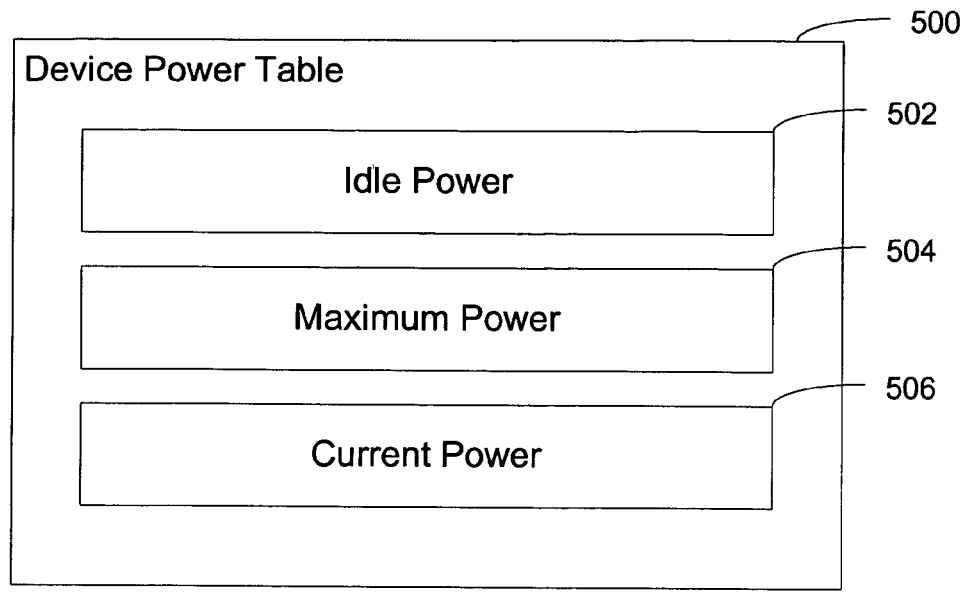
FIG. 5 is an illustration of a device power table according to one embodiment of the present invention.

FIG. 5 illustrates a device power table (500) according to one embodiment of the present invention. The device power table contains relevant power information for a device. The device power table may include information about idle power (502), maximum power (504), and current power (506). A thermal management policy may use these three parameters to determine the influence of one particular device on other devices that are designated to be in thermal proximity to one another. There may be a device power table for each device that participates in the system thermal management policy.

The device idle power (502) represents idle or leakage power when the device is in the D0 state (fully on and operational), but not actively in use. Local power management techniques may be applied and accounted for in the idle power calculation. The idle power number largely represents typical leakage power dissipation.

The device maximum power (504) represents the maximum power of the component. This number may represent the highest power under operating conditions not exacerbated through the use of synthetic workloads, such as a power virus. Typically, this number will represent the thermal design power level of the device.

The device current power (506) represents the power dissipation average across a thermally-significant period of time. This number is commonly represented by maximum power scaled by some utilization factor, but may be determined in a different manner depending on the device vendor's implementation.

Figure 6:
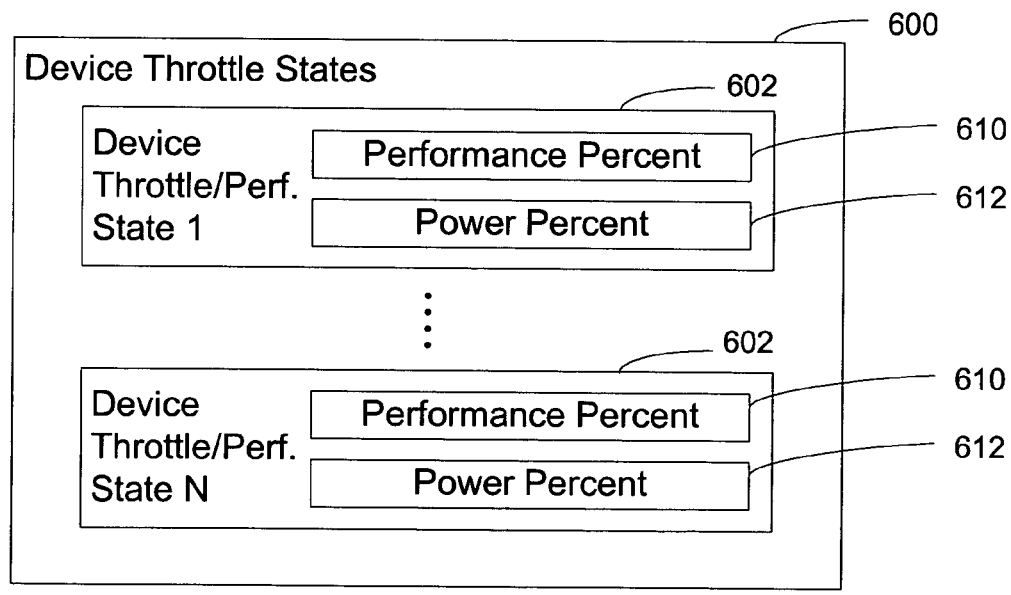
FIG. 6 is an illustration of a device throttle states table according to one embodiment of the present invention.

FIG. 6 illustrates a device throttle states table (600) according to one embodiment of the present invention. The device throttle states table lists throttle and/or performance states (602) associated with a particular device. The throttle and performance states (602) may include a performance percent (610) and a power percent (612). The performance percentage (610) indicates a decrease in device performance as a percentage of maximum performance. The power percentage (612) indicates a decrease in device power as a percentage of maximum power. There may be a device throttle states table for each device that participates in the system thermal management policy.

The throttle states represent states that reduce performance and power in a linear or sub-linear fashion (performance reduction % >=power reduction %). The performance states represent states that reduce performance and power in a non-linear fashion (performance reduction % <power reduction %). The thermal management policy may make a request for a device to operate in a lower power state by making use of the throttle/performance state information reported in the device throttle states table (600). The device may be responsible for prioritizing requests to use performance states (non-linear) as the first step to reaching the required power reduction, followed by throttling (linear) states once the device has reached the lowest performance state.

Figure 7:
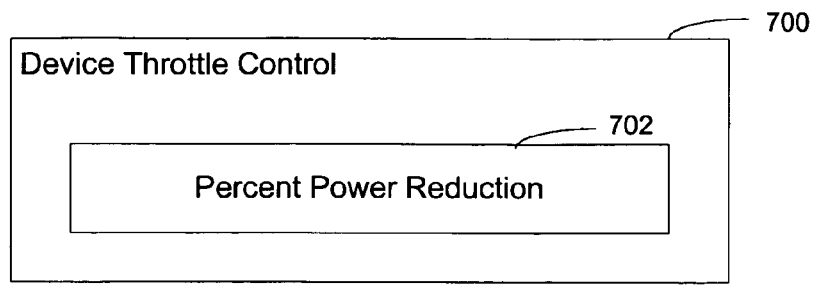
FIG. 7 is an illustration of a device throttle control object according to one embodiment of the present invention.

FIG. 7 illustrates a device throttle control object (700) according to one embodiment of the present invention. The device throttle control object allows the thermal management policy to reduce the power contribution of a particular device by placing a request to the device to reduce its power consumption as a function of percent of currently utilized power.

The thermal management policy may calculate the necessary reduction required as a result of using the current power dissipation as well as the proximity of the device. The device may be responsible for prioritizing requests to use performance states (non-linear) as the first step to reaching the required power reduction, followed by throttling states (linear) once the device has reached the lowest performance state.

The argument of this object, percent power reduction (702), defines the percent power reduction required by the thermal management policy. The method is responsible for mapping this request to the appropriate performance and/or throttle state associated with the actual device, as defined in the device throttle states table (700). The power reduction must meet the minimum requested by the thermal management policy.

In one embodiment, the device throttle control object may return a value that indicates the percent power reduction (relative to maximum power) that was initiated.

Figure 8:
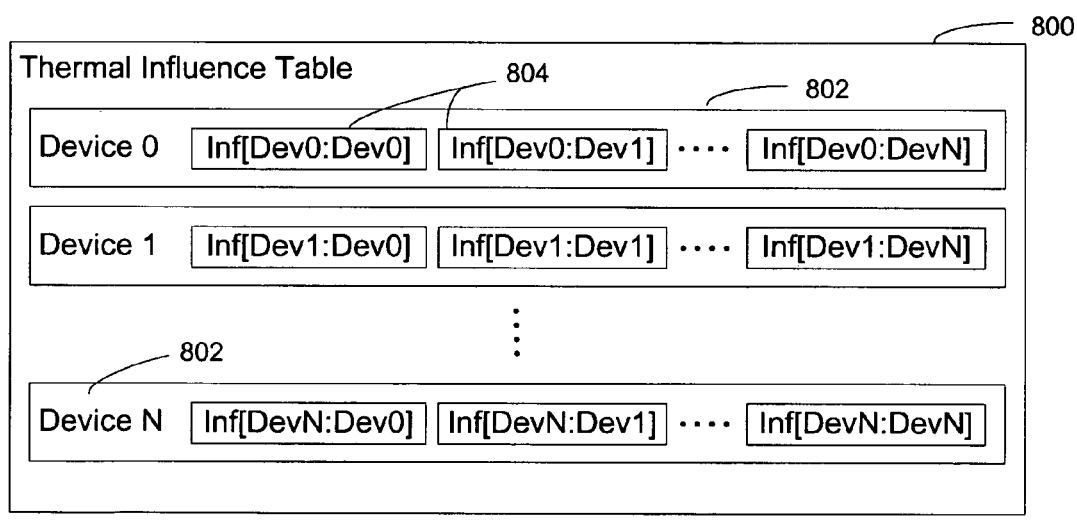
FIG. 8 is an illustration of a thermal influence table object according to one embodiment of the present invention.

FIG. 8 illustrates a thermal influence table object (800), also known as a thermal influence matrix or thermal proximity table (TPT), according to one embodiment of the present invention. The thermal influence table object describes the thermal relationships between this device and other thermally-related devices. The thermal influence table object of FIG. 8 is a variation of that which is described in FIG. 1. The thermal influence table is described in detail above in conjunction with FIGS. 1-3. Dynamic generation of the table is described above in conjunction with FIG. 4.

For each relationship in the table, the device name (802) is listed, followed by the theta (° C./W) between the devices (804). A thermal management policy may use this information to determine which device(s) should be thermally managed. In one embodiment, the thermal influence table object may be implemented in ACPI (Advanced Configuration and Power Interface) format, in accordance with the ACPI Specification, Revision 3.0, published Sep. 2, 2004. In this embodiment, the device name used is the ACPI device name.

The thermal influence between devices, or theta (804), is a number that represents the temperature influence on one device for a given change in power of another device, as described above. In one embodiment, this value may be scaled by a scaling factor to allow for additional precision of theta values. The scaling factor may be a multiple of 10. In one embodiment, the scaling factor is equal to 1000.

For a given device, a thermal management policy can rank the influence of each device on a desired device by evaluating the desired device's current power dissipation multiplied by the influence factor, theta. This factor gives a weighting of the amount of temperature influence that a particular device contributes relative to other devices participating in the power management policy. By ranking all of the contributions, the thermal management policy can determine which device(s) to throttle in order to thermally manage a desired device. A thermal management policy may also use the thermal influence table to calculate the required power reduction needed on the throttled devices in order to achieve a given temperature reduction on the desired device.

Figure 9:
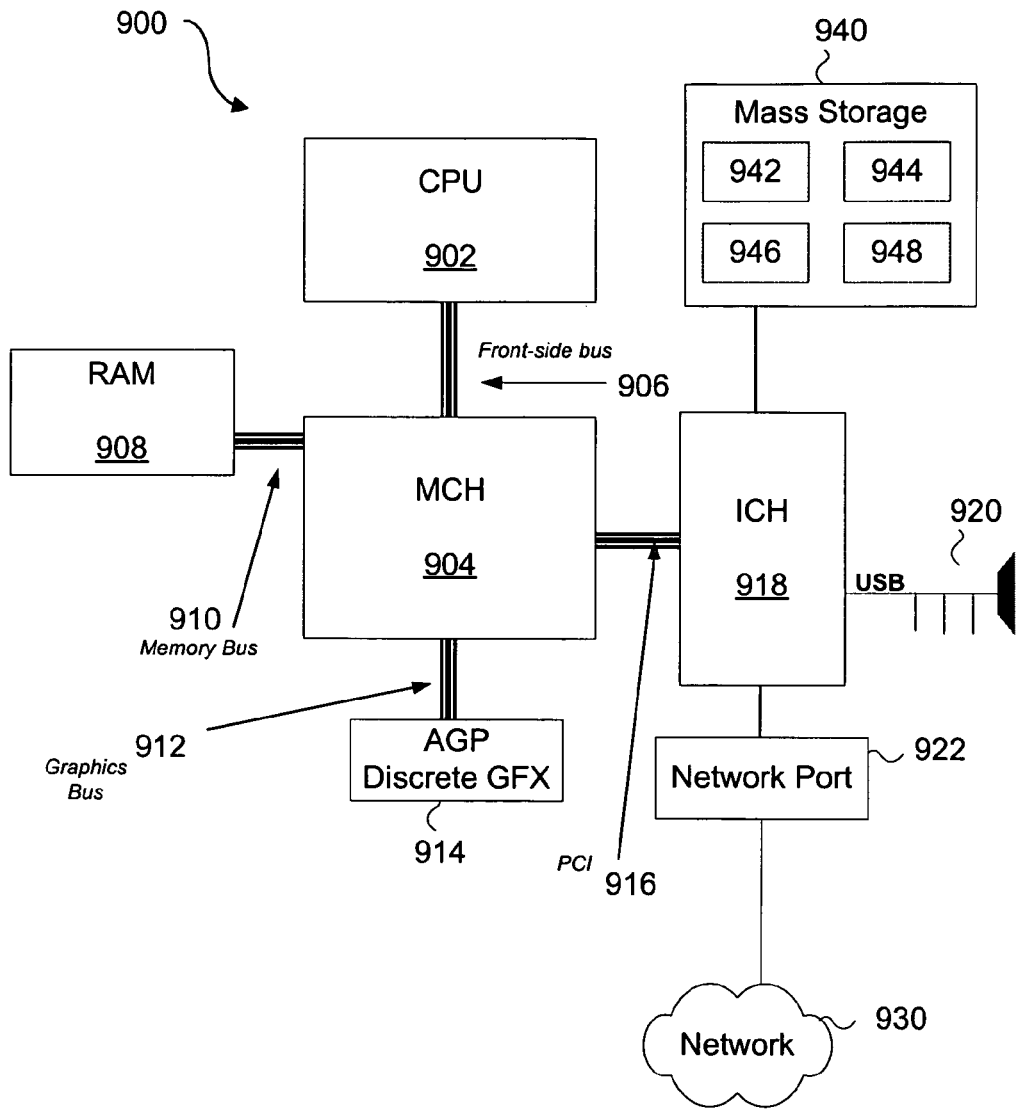
FIG. 9 is an illustration of a computer system according to one embodiment of the present invention.

FIG. 9 illustrates a block diagram (900) of an exemplary computer system according to one embodiment of the present invention. Processor (902) communicates with a memory controller hub (MCH) (904), also known as a Northbridge, via the front side bus (906). The MCH (904) communicates with system memory (RAM) (908) via a memory bus (910). The MCH (904) may also communicate via a graphics bus (912) with an advanced graphics port (AGP) (914) to interface with an external video display unit (not shown). The MCH (904) communicates with an I/O controller hub (ICH) (918), also known as a Southbridge, via a peripheral component interconnect (PCI) bus (916). The processor may be operatively connected to a network (930) via a network port (922) through the ICH (918). The system may also include a universal serial bus (USB) (920) coupled to the ICH (918).

A mass storage device (940), such as a hard disk drive, CD ROM drive, network drive, optical storage, or other storage device, may be coupled to the ICH (918). Thermal management software modules including the device power table (942), device throttle states (944), device throttle control (946), and thermal influence table (948) may be stored on the mass storage device (940). In other embodiments, these modules may be in another location in the computing system, or may be accessible to the computing system. These modules may be utilized by the system's thermal management policy to thermally manage the system as described above in conjunction with FIG. 4.

According to embodiments of the present invention, one or more thermal influence matrices may represent the thermal relationships between components in the system that participate in the thermal management policy. For example, components such as the CPU (902), MCH (904), AGP graphics (914), (ICH) 918, network device (922), or memory (908) may participate in the thermal management policy. Thus, a thermal influence matrix for the system (900) may include thermal relationships between all of these devices. Furthermore, as described above, the thermal management policy may use a thermal influence matrix in determining which devices in system (900) to throttle in order to most effectively perform thermal and power management of the system. Although a computer system configuration is illustrated, other embodiments of system configurations are possible, including but not limited to cellular telephones, handheld devices, mobile computers, servers, and other electronic devices.

FIG. 10 illustrates an example ACPI format thermal influence table object (1002) populated with sample values for the thermal relationships between four devices in the exemplary system of FIG. 9: CPU, MCH, ICH and MEM. Only these four devices of the system of FIG. 9 are shown for simplicity, however a thermal influence table for a system may include other components as well. These components may include any device in a computer system that participates in the system thermal management policy, including but not limited to: a microprocessor, memory controller hub (MCH), I/O controller hub (ICH), memory, local area network (LAN) device, wireless local area network (WLAN) device, or voltage regulator (VR).

Assuming that memory device MEM is a "hot" device, the thermal management policy may use the thermal influence table (1002) to determine which device(s) to throttle to reduce the temperature of the memory device MEM based on the current power dissipation of each device.

Given current power dissipation values of: $P_{CPU}$=10 W, $P_{MCH}$=5 W, $P_{ICH}$=20 W, and $P_{MEM}$=2 W, the thermal management policy may then calculate and rank the thermal contribution from each device. In one embodiment, the current power dissipation values may be obtained from a device power table, as described above in conjunction with FIG. 5. The current power dissipation values may be obtained in other ways as well, including but not limited to: reading the values from a location in memory, a hardware register, or another location.

To calculate the thermal contribution of each device, the thermal management policy may multiply the current power dissipation of each device by the influence of each device on the target ("hot") device. The result may be divided by a scaling factor of 1000 if the thermal influence table values have been scaled by 1000, as in the present example, however it is not necessary to use the scaling factor.

In the case where memory device MEM is over temperature, each device's contribution to MEM's temperature is calculated as follows:

Thermal Contribution of $CPU = P_{CPU} * Theta[CPU : MEM]/1000 =$ $$10W * 600(°C/kW)/1000(kW/W) = 6°C$$

Thermal Contribution of $MCH = P_{MCH} * Theta[MCH : MEM]/1000 =$ $$5W * 400(°C/kW)/1000(kW/W) = 2°C$$

Thermal Contribution of $ICH = P_{ICH} * Theta[ICH : MEM]/1000 =$ $$20W * 500(°C/kW)/1000(kW/W) = 10°C$$

Thermal Contribution of $MEM = P_{MEM} * Theta[MEM : MEM]/1000 =$ $$2W * 1000(°C/kW)/1000(kW/W) = 2°C$$

Thus, the thermal management policy can determine that the ICH device is the primary cause of thermal influence on the MEM device. The amount of throttling required to reduce MEM's target temperature by 2° C. can then be calculated as follows:

Desired Temp Reduction*Scaling Factor/Theta[ICH: MEM]2° C.*1000(W/kW)/500(° C./kW)=4 W Therefore, by reducing the power of the ICH device by 4 W, the temperature of the MEM device should be affected by approximately 2° C. A thermal management policy may then use the power state information from the device throttle states table to reduce the power of the ICH device by 4 W.

Thus, a method, apparatus, and system to determine the thermal influence of components within a system and usage of a thermal influence matrix within a computer system have been disclosed. These methods may be implemented in software or firmware, among other implementations. Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" may include include, but is not limited to, read only memory (ROM); random access memory (RAM); magnetic disk storage media; optical storage media, flash memory devices; electrical, optical, acoustical, or other forms of propagated signals (e.g., carrier waves, infrared signals, digital signals, etc.), and others. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

In the above description, numerous specific details are set forth. However, it is understood that embodiments may be practiced without these specific details. In other instances, well-known circuits, structures and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method comprising:
   determining a thermal influence of a first device on a second device in a system using a thermal influence matrix that is automatically calculated in response to a change in system configuration, the automatic calculation comprising stressing the first device to maximum power and monitoring and recording the temperature of the first and second devices until the first device reaches a steady state, the change in system configuration comprising a change in one of a microprocessor, memory controller hub (MCH), I/O controller hub (ICH), memory, or a LAN device; and
   reducing a power of the first device to reduce a temperature of the second device based on the determined thermal influence.

2. The method of claim 1, further comprising calculating a required power reduction for the first device to achieve a desired temperature reduction for the second device.

3. The method of claim 1, wherein the first device comprises one of: microprocessor, memory controller hub (MCH), I/O controller hub (ICH), memory, or a LAN device.

4. The method of claim 3, wherein the second device comprises one of: microprocessor, memory controller hub (MCH), I/O controller hub (ICH), memory, or a LAN device.

5. The method of claim 1, wherein each of the components is represented by a row and a column of the matrix and a value at an intersection of one of the rows and one of the columns indicates a thermal relationship between the component represented by the row and the component represented by the column.

6. The method of claim 5, wherein the value at an intersection of one of the rows and one of the columns is equal to the derivative of the temperature of the component represented by the row with respect to the derivative of the power of the component represented by the column over time as a power stress is being applied to the component represented by the column.

7. The method of claim 6, wherein the values in the matrix are encoded based on a predetermined air flow rate.

8. The method of claim 1, further comprising:
   determining a thermal influence of the first device on itself;
   determining a thermal influence of the second device on the first device;
   determining a thermal influence of the second device on itself; and
   storing the determined thermal influences in a memory location.

9. The method of claim 8, wherein the memory location comprises system memory.

* * * * *